Patented Dec. 25, 1928.

1,696,197

UNITED STATES PATENT OFFICE.

ROBERT GRIESSBACH, OF LUDWIGSHAFEN-ON-THE-RHINE, AND KURT RÖHRE, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

PRODUCTION OF SODIUM NITRATE.

No Drawing. Application filed September 22, 1927, Serial No. 221,394, and in Germany October 14, 1926.

The present invention relates to the recovery of sodium nitrate from its aqueous solutions.

Hitherto, the recovery of sodium nitrate from dilute solutions, such as those which are obtained in the treatment of caliche, has been effected either by cooling to a low temperature or by evaporation. A considerable expenditure of energy is necessary for carrying out either of these methods, which substantially increases the cost of the product thus obtained.

We have now found that sodium nitrate may be economically recovered from the said dilute solutions by converting the sodium nitrate in solution into a double salt which may also be a mixed salt which is only slightly soluble at ordinary temperatures, and subjecting the same after separation from the liquid to a treatment suitable for the production of sodium nitrate. For example, the addition of solid sodium sulfate causes the deposition of a double salt of the composition $$NaNO_3.Na_2SO_4.H_2O \text{ (Darapskite)},$$

and in this manner it is easy to precipitate, from a cold-saturated solution of sodium nitrate, 50 per cent of the nitrate in the form of the said double salt, at ordinary temperature. In order to recover the remainder of the nitrate, the mother liquor left after the separation of the double salt is preferably employed for leaching fresh quantities of nitrate earth. The double salt may be decomposed into its two components by heating it to above 70° C. with just the amount of water required for dissolving the nitrate contained therein, the residual sodium sulfate, which is only slightly soluble in hot water, being separated by hot filtration. The sodium nitrate is easily recovered, in a solid and practically pure condition, by cooling the solution.

The greater portion of the sodium sulfate required for the precipitation of the double salt is recovered when the latter is decomposed, and the remainder may be recovered by strongly cooling the mother liquor remaining after the separation of the double salt.

The advantage of the process according to the present invention consists in the far smaller consumption of heat and energy, so that even inferior grades of caliche for which leaching at low temperatures presents special advantages may be successfully treated. No heat need be introduced into the system in order to separate the nitrate in the form of the double salt, and only a limited supply of heat is required for the conversion of the double salt into its components. A substantial advantage over the initially mentioned process of evaporating the aqueous solutions in order to concentrate the same consists also in the fact that the solutions to be heated in the treatment of the double salt are free from chlorids, so that the otherwise usual extensive corrosion of the material of the apparatus is avoided.

The following example will further illustrate the nature of the said invention which however is not limited thereto.

Example.

To a solution of the kind obtained by leaching caliche at ordinary temperature, and containing, per 1000 kilograms of water, about 550 kilograms of sodium nitrate, 37 kilograms of sodium sulfate and 240 kilograms of common salt, 490 kilograms of anhydrous sodium sulfate, are added gradually while well stirring at ordinary temperature. About 780 kilograms of double salt are formed which are filtered off by suction. The mother liquor is cooled to about 8° C. whereupon about 90 kilograms of Glauber's salt separate out.

The decomposition of the double salt is effected, for example, in the following manner.

1000 kilograms of the double salt are heated with 720 kilograms of a stock solution containing about 87 kilograms of sodium nitrate and 59 kilograms of sodium sulfate per 100 kilograms of water, about 70 kilograms of water being evaporated during the treatment. The undissolved sediment consists of about 580 kilograms of sodium sulfate, which is separated while still hot. The filtrate is cooled to the ordinary temperautre, whereby about 350 kilograms of sodium nitrate separate out. The liquid obtained on filtration may be employed as the decomposing solution for the next batch, whilst the deposited sodium sulfate is returned to the main process.

What we claim is:

The process of recovering sodium nitrate from aqueous solutions containing it, which consists in precipitating sodium nitrate as a difficultly soluble double salt, by adding sodium sulfate, and decomposing the said double salt, by heating it with about the amount of water required for dissolving the sodium nitrate contained therein, the residual sulfate being separated by hot filtration and the sodium nitrate recovered by cooling the solution.

In testimony whereof we have hereunto set our hands.

ROBERT GRIESSBACH.
KURT RÖHRE.